US011456962B2

(12) United States Patent
Nádas et al.

(10) Patent No.: US 11,456,962 B2
(45) Date of Patent: Sep. 27, 2022

(54) DELAY-AWARE RESOURCE SHARING

(71) Applicant: Telefonaktiebolaget LM Ericsson (publ), Stockholm (SE)

(72) Inventors: Szilveszter Nádas, Budapest (HU); Csaba Keszei, San Jose, CA (US); Sandor Laki, Budapest (HU); Gergo Gombos, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/055,414

(22) PCT Filed: Sep. 28, 2018

(86) PCT No.: PCT/EP2018/076483
§ 371 (c)(1),
(2) Date: Nov. 13, 2020

(87) PCT Pub. No.: WO2019/219225
PCT Pub. Date: Nov. 21, 2019

(65) Prior Publication Data
US 2021/0194817 A1 Jun. 24, 2021

Related U.S. Application Data

(60) Provisional application No. 62/672,157, filed on May 16, 2018.

(51) Int. Cl.
*H04L 12/841* (2013.01)
*H04L 47/28* (2022.01)
(Continued)

(52) U.S. Cl.
CPC .............. *H04L 47/28* (2013.01); *H04L 47/24* (2013.01); *H04L 47/30* (2013.01); *H04L 47/32* (2013.01)

(58) Field of Classification Search
CPC ......... H04L 47/10; H04L 47/22; H04L 47/24; H04L 47/2441; H04L 47/2483;
(Continued)

(56) References Cited

U.S. PATENT DOCUMENTS 5,121,383 A * 6/1992 Golestani .............. H04L 47/822
370/537
6,577,596 B1 * 6/2003 Olsson .................... H04L 69/04
370/395.42
(Continued)

FOREIGN PATENT DOCUMENTS

CA 2691959 A1 * 3/2006 ........... G10L 19/005
CA 2611180 A1 * 12/2006 ............. H04L 47/10
(Continued)

OTHER PUBLICATIONS

International Search Report and Written Opinion of the International Searching Authority, PCT/ EP2018/076483, dated Feb. 12, 2019, 13 pages.
(Continued)

*Primary Examiner* — Kevin D Mew
(74) *Attorney, Agent, or Firm* — Sage Patent Group

(57) ABSTRACT

The invention relates to a method for controlling a transmission buffer in a transmission node of a transmission network transmitting data packets of a data packet flow, wherein each data packet includes a delay value indicating a transmission delay requirement of the data packet and a packet value indicating a level of importance of the data packet. The buffer includes different buffer regions and an arriving data packet is put into its respective buffer region based on the delay requirement indicated by a delay value contained in the data packet. The number of bytes waiting before the freshly arrived data packet cannot increase so that
(Continued)

the delay requirement is met and possibly other packets in the buffer might be dropped for the newly arriving packet.

20 Claims, 13 Drawing Sheets

(51) Int. Cl.
  *H04L 47/24* (2022.01)
  *H04L 47/30* (2022.01)
  *H04L 47/32* (2022.01)
(58) Field of Classification Search
  CPC ....... H04L 47/27; H04L 47/28; H04L 47/283;
       H04L 47/286; H04L 47/30; H04L 47/32
  See application file for complete search history.

(56) References Cited

U.S. PATENT DOCUMENTS

| | | | | |
|---|---|---|---|---|
| 6,741,563 | B2* | 5/2004 | Packer | H04L 47/2408 370/231 |
| 6,760,309 | B1* | 7/2004 | Rochberger | H04L 47/2441 370/468 |
| 6,947,756 | B2* | 9/2005 | Khan | H04L 47/14 455/560 |
| 7,020,143 | B2* | 3/2006 | Zdan | H04L 47/2408 370/401 |
| 7,088,677 | B1* | 8/2006 | Burst, Jr. | H04M 3/367 370/229 |
| 7,212,490 | B1* | 5/2007 | Kao | H04L 43/0852 370/406 |
| 7,568,045 | B1* | 7/2009 | Agrawal | H04L 43/0852 709/233 |
| 2002/0138854 | A1 | 9/2002 | Desai et al. | |
| 2003/0189935 | A1* | 10/2003 | Warden | H04L 47/6215 370/395.21 |
| 2003/0219014 | A1* | 11/2003 | Kotabe | H04L 47/33 370/375 |
| 2005/0058149 | A1* | 3/2005 | Howe | H04L 49/602 370/428 |
| 2007/0242675 | A1* | 10/2007 | Romrell | H04L 12/4633 370/395.4 |
| 2007/0280111 | A1* | 12/2007 | Lund | H04L 69/163 370/235 |
| 2010/0135158 | A1* | 6/2010 | Adams | H04L 47/805 370/235 |
| 2011/0261814 | A1* | 10/2011 | Matthews | H04L 47/28 370/389 |
| 2013/0136000 | A1* | 5/2013 | Torres | H04L 47/326 370/235 |
| 2015/0244635 | A1 | 8/2015 | Orten et al. | |
| 2017/0155590 | A1* | 6/2017 | Dillon | H04L 43/0852 |
| 2017/0244648 | A1* | 8/2017 | Tse | H04N 21/2365 |

FOREIGN PATENT DOCUMENTS

| | | |
|---|---|---|
| WO | WO 2014/189422 A1 | 11/2014 |
| WO | WO 2015/172815 A1 | 11/2015 |
| WO | WO 2019/108102 A1 | 6/2019 |

OTHER PUBLICATIONS

Ganos, P. A., et al., "ATM Switch With Multimedia Traffic Priority Control," European Transactions on Telecommunications, Wiley & Sons, Chchester, GB, vol. 7, No. 6, Nov. 1, 1996 (XP000636239) pp. 527-540.

Sivaraman, A., et al., "Programmable Packet Scheduling At Line Rate," SIGCOMM '16, Aug. 22-26, 2016, Florianopolis, Brazil, 14 Pages.

Nádas, et al., "Per Packet Value: A Practical Concept for Network Resource Sharing," Presented in Dec. 2016 at the IEEE Global Communications Conference (GLOBECOM) 7 pages.

* cited by examiner

DELAY-AWARE RESOURCE SHARING

CROSS REFERENCE TO RELATED APPLICATIONS

This application is a 35 U.S.C. § 371 national stage application of PCT International Application No. PCT/EP2018/076483 filed on Sep. 28, 2018, which in turns claims domestic priority to U.S. Provisional Patent Application No. 62/672,157, filed on May 16, 2018, the disclosures and content of which are incorporated by reference herein in their entirety.

TECHNICAL FIELD

The present application relates to a method for controlling a transmission buffer in a transmission node of a transmission network where data packets of data packet flows are transmitted. Furthermore, the corresponding control entity configured to control the transmission buffer in the transmission node is provided. Additionally, a computer program comprising program code and a carrier comprising the computer program is provided.

BACKGROUND

In communication networks, e.g. based on the Internet protocol, various kinds of data packets belonging to different data traffic applications are transmitted. The different kinds of data traffic may differ with respect to their sensitivity concerning delay which occurs while data packets of the data traffic are forwarded through the communication network. By way of example data packets of a file download may have a lower delay requirement compared to applications such as multimedia streaming where an excessive delay may adversely impact the user experience.

The basic concept of per packet marking based bandwidth sharing control method is the following. At an edge node each packet gets a label that expresses its importance. In bottleneck node these importance values are used in bandwidth sharing decision. Packets of a flow can have different importance values. For example, in case of congestion, packets with lowest importance will be dropped first.

In Per Packet Operator Value methods are proposed to control bandwidth sharing among flows even when per flow queuing is not possible. Both concepts are based on per packet marking based bandwidth sharing control. Algorithms are defined for a single buffer, which results in a shared delay among these flows.

Providing bounded delay is important for a number of applications. In many cases the delay requirement of a flow is independent of its bandwidth requirement or general importance. For example, real-time layered video (for gaming or conversations) could be transmitted with its base layer marked more important than its enhancement layers. This would ensure that enhancement layers get transmitted only when all base layers (and other more important traffic) can also be transmitted (including traffic with potentially less stringent delay requirements). In general many applications would benefit from a low delay, open-loop elastic network service, especially since low-delay applications often cannot rely on retransmissions and end-to-end control loops to govern transmission rates. Being able to send excess in a layered fashion would be a good solution. Thus, in addition to Packet Value (PV) the proposed method also associates the Delay Class (DC) expressing the acceptable per-hop delay of the flow, per bottleneck, to each packet. For providing end-to-end delay guarantees additional mechanisms might be needed.

Even though the known solutions provide good results they could only be achieved with small bitrates. Furthermore, it was found that tuning the control entities for all potential traffic patterns is a hard problem.

Accordingly, what is needed is a quick enough algorithm for handling both resource sharing and delay requirements which can be implemented in real nodes of a network, which can work at lager bitrates and which does not require the retuning for different traffic mixes.

SUMMARY

This need is met by the features of the independent claims. Further aspects are described in the dependent claims.

According to a first aspect a method for controlling a transmission buffer in a transmission node located in a transmission network is provided where data packets of a data packet flow are transmitted. Each data packet comprises a delay value indicating a transmission delay requirement of a data packet and a packet value indicating a level of importance of the data packet. The transmission buffer comprises different buffer regions provided for inserting newly arriving data packets having different delay requirements, wherein each buffer region stores the newly arriving data packets having a predefined range of delay requirements. According to the method an arrival of a first data packet to be added to the transmission buffer is detected and the delay value and the packet value of the first data packet is determined. Furthermore, the buffer region of the transmission buffer into which the first data packet is to be inserted is determined in dependence on the delay value of the first data packet. When the buffer region is known, it is then determined whether a second data packet is present in one of the buffer regions having a lower delay requirement so that the second data packet will be transmitted after the first data packet. If this is the case, a waiting data size of candidate data packets is determined which are located in the transmission buffer such that they are waiting for transmission before the second data packet. Furthermore, the size of the first data packet to be added in the determined buffer region is determined and at least one third data packet is determined among the candidate data packets to be dropped in response to the first data packet to be added. The at least one third data packet is determined taking into account the packet values of the candidate data packets such that the waiting data size does not increase. The at least one third data packet is then dropped and the first data packet can be added to the determined buffer region.

Accordingly, the data packets are placed into the different buffer regions such that the size of the data waiting before the freshly arriving data packet does not increase. Accordingly, the delay requirement is met when new packets arrive later into the buffer regions with higher delay requirements. When there are packets in the buffer regions with lower delay requirements, then some packets have to be dropped to make place for this newly arriving packet in order not to increase the data size such as the number of bytes waiting before the packets with lower delay requirements. The packet value and the delay value provides a framework for selecting the packets to be dropped to make place for the newly arriving first packet.

Furthermore, the corresponding control entity configured to control an operation of a transmission node with a transmission buffer is provided which transmits the data packets of the data packet flow to another node wherein the control entity comprises a memory and at least one processing unit, wherein the memory contains instructions executable by the at least one processing unit. The control entity is operative to function as discussed above or as discussed in further detail below.

Additionally, a computer program comprising program code to be executed by at least one processing unit of the control entity is provided wherein execution of the program code causes the at least one processing unit to execute a method as discussed above or as discussed in further detail below.

Additionally, a carrier comprising the computer program is provided wherein the carriers is one of an electronic signal, optical signal, radio signal, or computer readable storage medium.

As an alternative a control entity is provided for controlling a transmission buffer which transmits the data packets of the data packet flow to another node, wherein each of the data packets comprises a delay value and a packet value. The control entity can comprise a first module configured to detect an arrival of a first data packet be transmitted to another node. A second module determines the delay value and the packet value of the first data packet and a third module of the control entity is configured to determine the buffer region of the transmission buffer into which the first data packet is to be inserted in dependence on the delay value of the first data packet. The transmission buffer comprises different buffer regions for storing newly arriving data packets having different delay requirements, wherein each buffer region stores the newly arriving data packets having a predefined range of delay requirements. Furthermore, a fourth module is configured to determine whether a second data packet is present in one of the buffer regions having a lower delay requirement so that the second data packet will be transmitted after the newly added first data packet. If this is the case, a fifth module is configured to determine a waiting data size of candidate data packets which are located in the transmission buffer such that they are waiting for transmission before the second data packet. A sixth module is furthermore configured to determine a size of the first data packet and a seventh module is configured to determine at least one third data packet among the candidate data packets that is to be dropped in response to the added first data packet. The at least one third data packet is determined taking into account the packet values of the candidate data packets such that the waiting data size does not increase. The third module is furthermore configured to drop the at least one third packet when the first packet is inserted.

Furthermore, a computer program comprising program code to be executed by at least one processing unit of a control entity is provided wherein the execution of the program code causes the at least one processing unit to execute a method as mentioned above or as discussed in further detail below.

Additionally a carrier comprising the computer program is provided wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION

Figure 1:
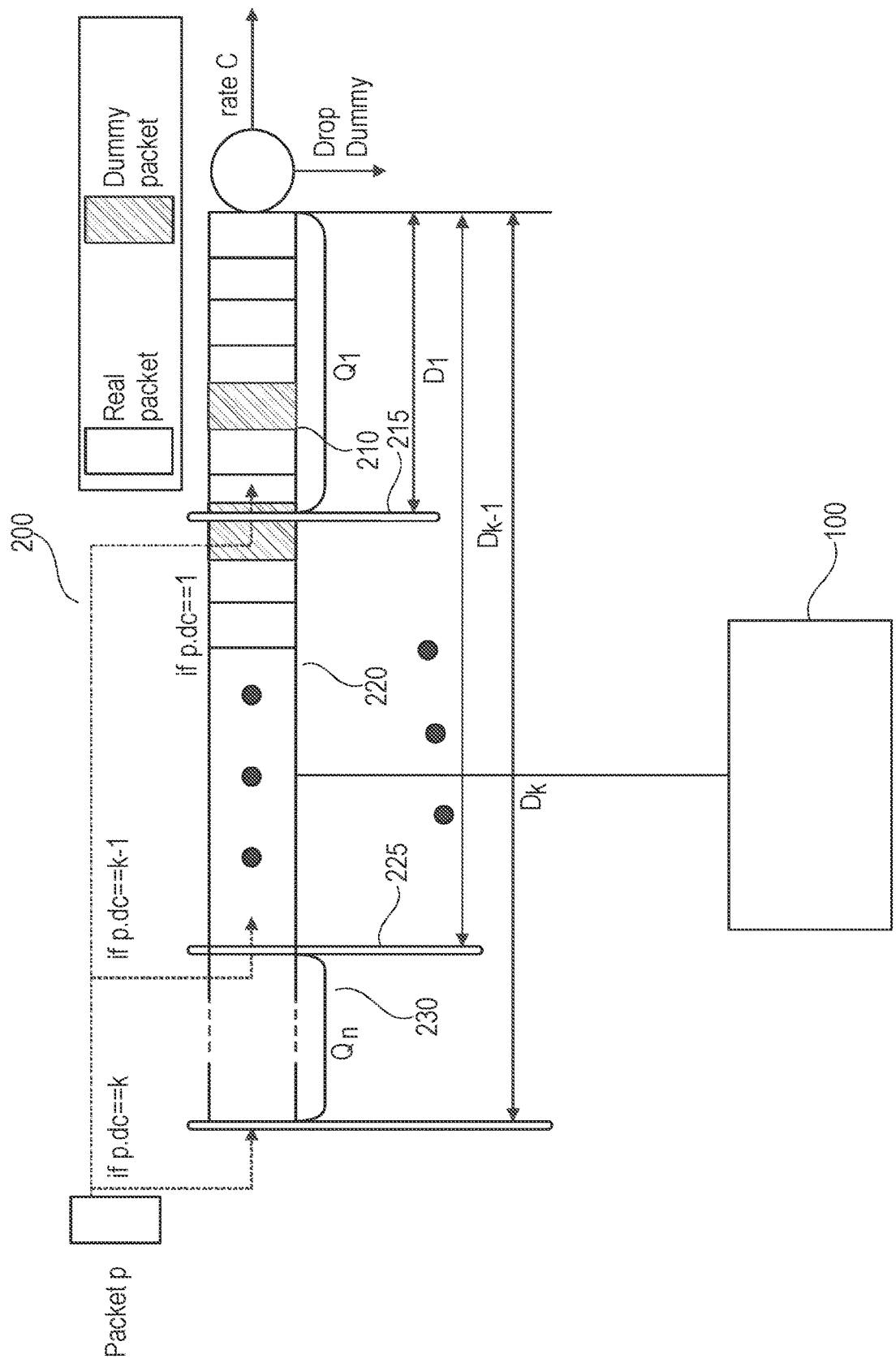
FIG. 1 shows a schematic overview over a delay aware resource node with a control entity controlling the arriving of new data packets into a buffer such that the data size waiting before packets having a lower delay requirement is not increased.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather the various elements are represented such that their function and general-purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

As will be explained below a transmission buffer and its control is provided which may be implemented as a chained set of FIFO buffers in order to meet delay requirements by design. The buffer comprises different buffer regions and an arriving data packet is put into its respective buffer region based on the delay requirement indicated by a delay value contained in the data packet. The number of bytes waiting before the freshly arrived data packet cannot increase so that the delay requirement is met by algorithm design and no further mechanism is needed.

A newly arriving packet may arrive later into in a buffer region having a higher delay requirement meaning that it has to be transmitted earlier than other packets. When there are packets in the buffer regions with lower delay requirements, meaning that they can remain a longer time in the buffer until they have to be transmitted, then some packets have to be dropped to make place for this newly arriving packet in order not to increase the data size such as the bytes waiting before the packets with the lower delay requirement. Each packet comprises a delay value and a packet value indicating a level of importance of the data packet and Per Packet Value, PPV, frame work provides a natural way of selecting the packet to be dropped in order to provide the space for the newly arriving packet. The packet to be dropped maybe the packet with the smallest packet value among the candidate packets.

Furthermore, as will be explained below dummy packets may be created when there is a free space in the buffers in front of a newly arriving packet, when the latter is added to the end of the buffer region. These dummy packets represent the opportunity to delay these packets more instead of dropping. Finally an efficient histogram based limitation of the concept is described in connection with FIG. 9 and the following.

FIG. 1 schematically shows a part of the node which receives the arriving data packet and which inserts the arriving data packet named as first data packet into a transmit buffer 200 based on a delay value indicating a transmission delay requirement of the data packet and based on the packet value indicating a level of importance of the data packet. The level of importance can represent the gain for the operator when this packet is delivered wherein the network node on the network will try to maximize the total aggregate packet value delivered using the available resources.

The arriving packets are marked at the edge of the network assigning both the packet value and the delay class to each packet. The packet scheduling and dropping at the node shown in FIG. 1 is solely based on these packet markings. As shown in FIG. 1 the buffer 200 comprises different buffer regions 210, 220, 230 for different delay values or classes, wherein n delay classes are implemented in the embodiment of FIG. 1. Furthermore the borders 215 and 225 between the buffer regions are shown. Accordingly, the node has an egress port rate c and n delay classes so that the buffer is split into different regions $Q_1, Q_2, \ldots Q_n$ defined by the per-hop delay requirements $D_1 < D_2 < \ldots D_n$. The packets are transmitted from the packet region with the highest delay requirement $D_1$ and wherein the other buffer regions have lower delay requirements. When the time is considered that the packet can stay in the transmit buffer the delay requirement $D_1$ is smaller than $D_2$, smaller then $D_N$. The size of each buffer region $Q_1$ is calculated as follows:

$$|Q_i| = D_i \times C - \Sigma_{j=1}^{i-1} |Q_j|.$$

This means that a newly arriving packet can be inserted into the middle of the buffer according to the delay class, resulting in a delay class based packet scheduling order. A control entity 100 is provided controlling the operation of the transmission buffer 200 and controlling the insertion, dropping and dequeuing of packets before the packet is transmitted from the node to another node. The control entity 100 aims at maximizing the transmitted packet value while keeping the delay requirements at the same time.

Figure 3:
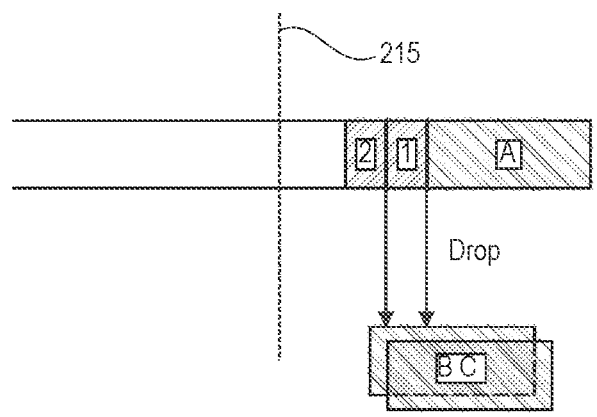
FIG. 3 shows a schematic view of the situation of FIG. 2 when the two data packets are inserted without the use of dummy packets.
Figure 4:
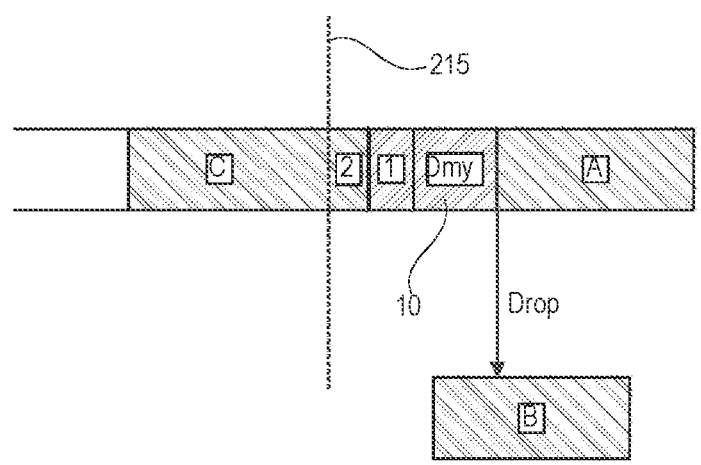
FIG. 4 shows the situation of FIG. 2 after the insertion of the two packets when dummy packets are used.

This can be achieved by using at least some of the following five mechanisms:

1. Delay-based scheduling order: At packet arrival the packet with DC (Delay Class) c is inserted into the end of buffer region $Q_c$ ensuring that the packet can be served within its delay requirement $D_c$.
2. Value-based dropping: Whenever a packet with DC c arrives into a full buffer region $Q_c$, if its PV (Packet Value) is less than or equals to the minimum PV in buffer regions $Q_1, \ldots, Q_c$, it is dropped. Otherwise, the packets with the smallest packet value(s) in buffer regions $Q_1, \ldots, Q_c$ are dropped until there is enough room for the new packet.
3. Replacing dropped packets with dummy packets: If the total length of dropped packets exceeds the length of the packet to be enqueued, the last dropped packet (with the highest PV) is kept, is truncated to the length of the excess and is marked as dummy packet, also called first dummy packet, here in after. These first dummy packets keep their original PV and are handled the same way as normal packets in the buffer, but will not actually get transmitted, hence cause no real queuing delay to packets after them. They are kept to reserve space in the buffer and thereby avoid extensive packet drops due to small sized, low delay, high PV packets, as illustrated in FIG. 2-4.

Figure 2:
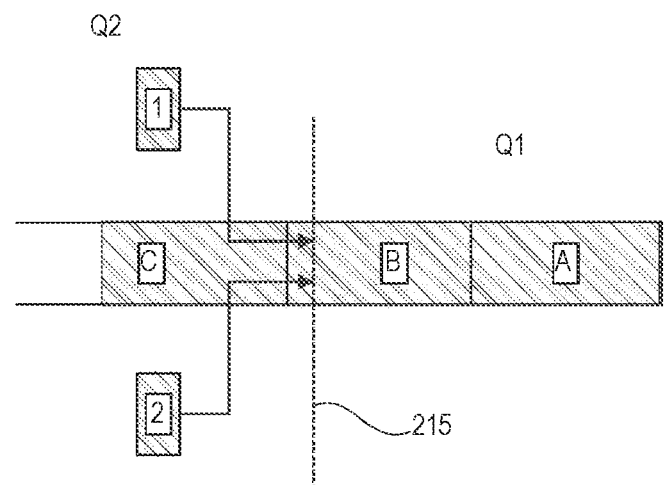
FIG. 2 shows a schematic view of the buffer having different buffer regions into which two data packets should be inserted.

As shown in FIG. 2, two data packets indicated as one and two arrive at the buffer 200 and should be inserted into $Q_1$ in view of the highest delay requirement, meaning a low delay class. 215 indicates the border between the highest delay class $Q_1$ and the second delay class $Q_2$. As shown in FIG. 2 there are three larger packets present with a lower packet value A, B and C which are waiting for the transmission wherein the packet C is provided in $Q_2$. When the first dummy packets are not used both packet B and packet C would have to be dropped, since after the arrival of packet 1, B is dropped and C shifts ahead to $Q_1$ and will be in the way when packet 2 arrives. Accordingly, without the use of the first dummy packets, packets B and C would be dropped as shown in FIG. 3. However, parts of packet B are kept as a first dummy packet 10 as shown in FIG. 4. This dummy packet prevents packet C from shifting into $Q_1$ so it will not be in the way when the second packet arrives.

Figure 5:
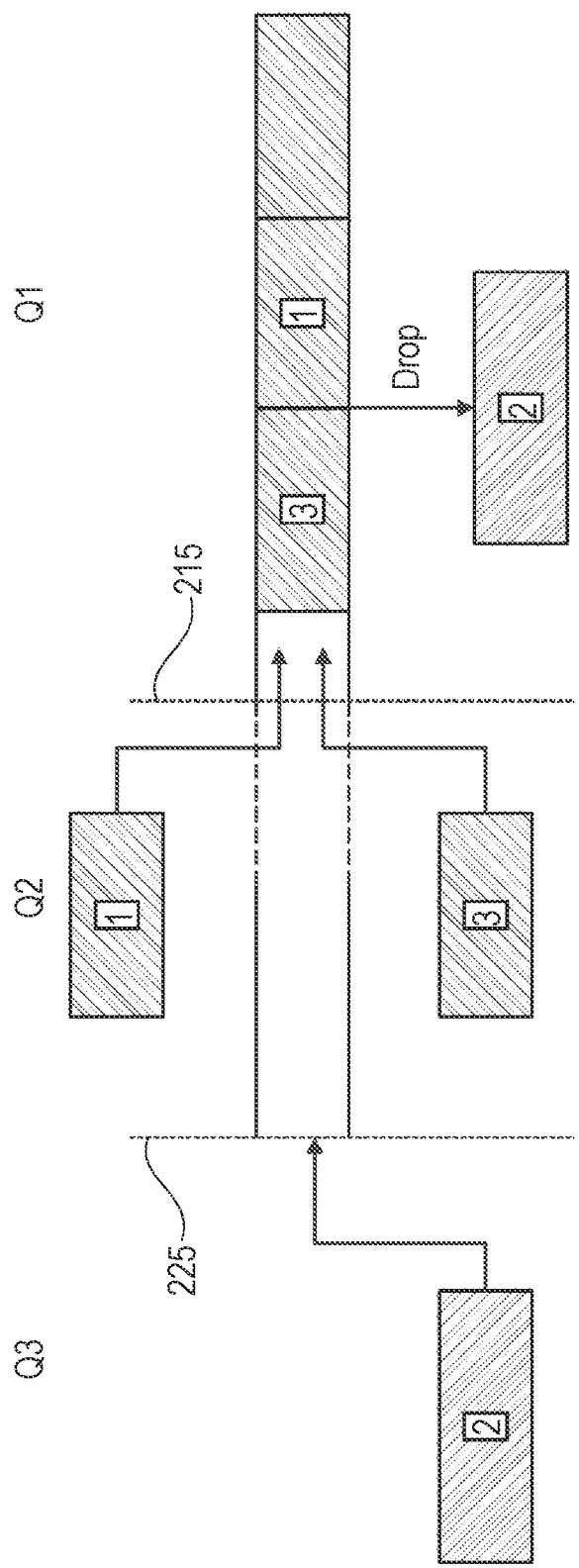
FIG. 5 shows another schematic view of an example where three data packets of different delay values have to be inserted without the use of dummy packets.
Figure 6:
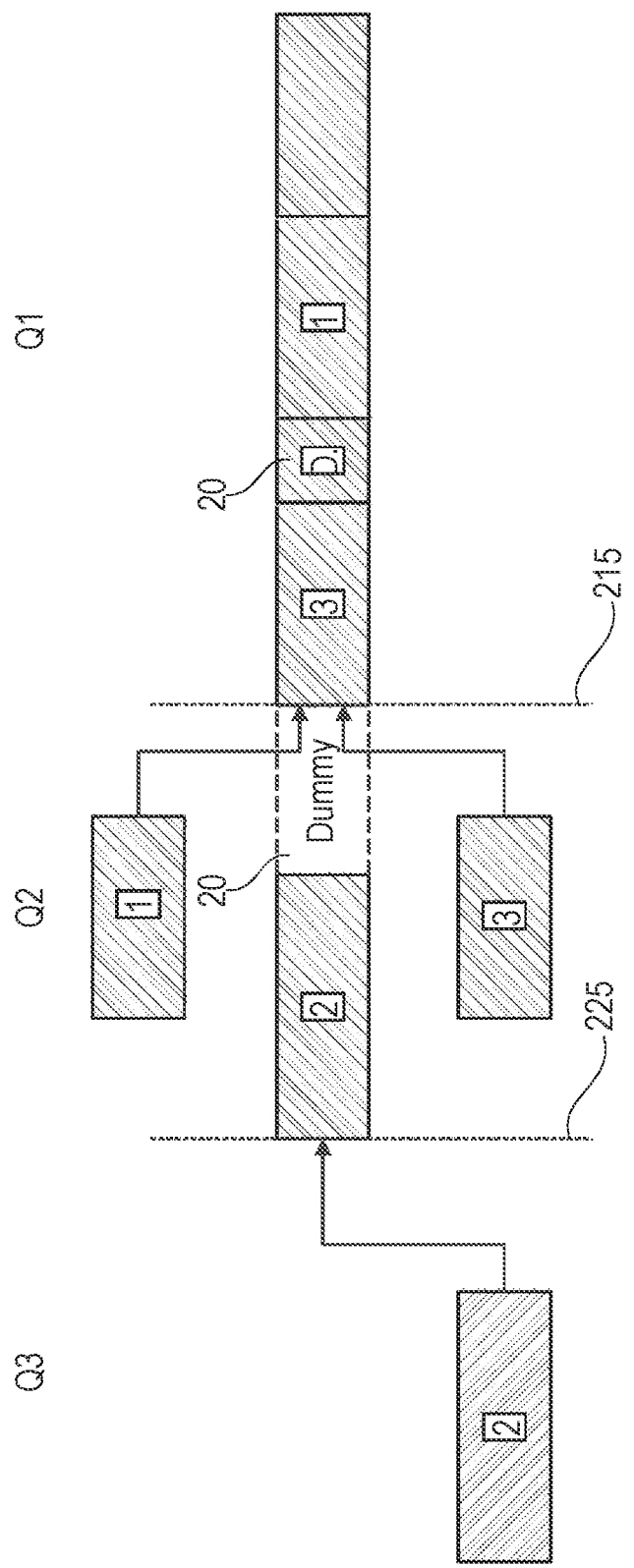
FIG. 6 shows a situation of FIG. 5 with the use of dummy packets to prevent unnecessary packet drops.

4. Queue expansion by inserting dummy packets: A packet is always inserted to the end of its respective buffer region $Q_c$. The buffer space before the packet is filled with dummy packets, called second dummy packets hereinafter which have the smallest possible packet value, e.g. PV=0. This again helps to keep the arriving packet longer in its buffer region preventing an erroneous drop. FIGS. 5 and 6 show the arrival situation when the second dummy packet may be helpful. As shown in FIG. 5 the packets with numbers 1, 2 and 3 arrive in this order as indicated by the number wherein packets 1 and 3 should be added to the first buffer region $Q_1$ and packet number 2 should be added to buffer region $Q_2$. In case of FIG. 5, packet 2 is queued to region $Q_1$ and thus has to be dropped in view of arriving packet 3. This is avoided with the use of the second dummy as shown in FIG. 6. In FIG. 6 the inserted dummy packet 20, the second dummy packet prevents this. The dummy packets 20 with packet value of zero behave like many one byte long packets. However, they are inserted as lager single packets instead and they are split whenever needed, meaning when they occupy the border of buffer regions such as the border 215 or 225 and when a packet is to be inserted as shown in FIG. 6.

5. Dequeueing real packets and dropping dummy packets: Whenever a port is idle, the dummy packets from the front of the buffer are dropped if any dummy packet is present and the first real packet is dequeued and sent out.

Figure 7:
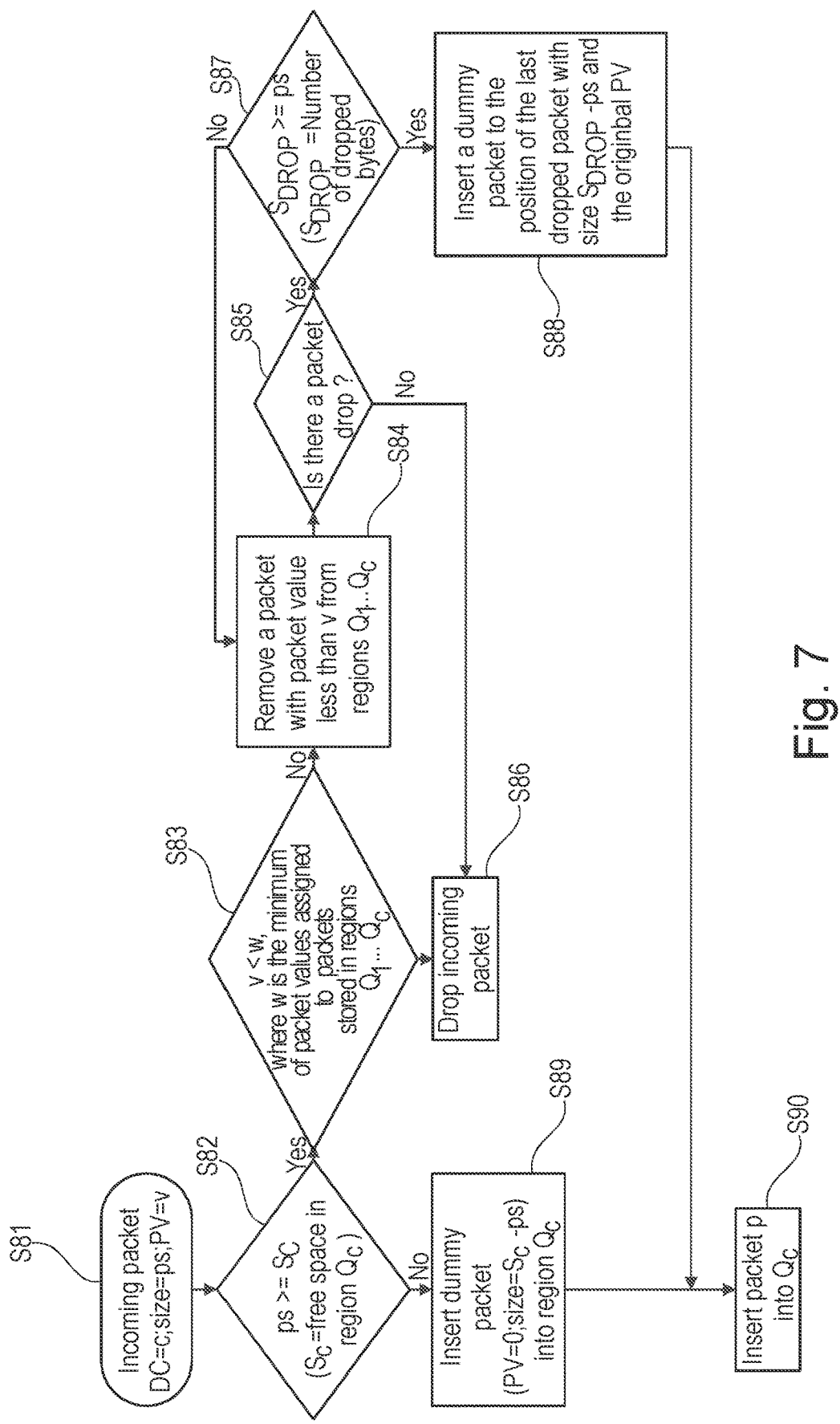
FIG. 7 shows an example flowchart of a method carried out by the node shown in FIG. 1 for enqueuing a newly arriving packet.

FIG. 7 summarizes the workflow discussed above. In step S81 an incoming packet is detected which has a certain delay value, a certain packet size, and a certain packet value so that the buffer region can be determined into which the data packet has to be inserted. In step S82 it is checked whether there is a free space in the determined packet region. If the size of the packet is larger than the free space in the corresponding buffer region it is checked in step S83 whether the packet value is smaller than the minimum value assigned to the packets stored in the buffer regions having higher delay requirements or the same delay requirements. If the packet value of the incoming packet is smaller than the packet values in these buffer regions, the incoming packet is dropped in step S86. If it is determined in step S83 that packets are available with smaller packet values in the buffer regions then a packet is removed from the regions having a smaller packet value than the packet value of the arriving packet in step S84. In step S85 it is then checked whether a packet drop has occurred. As it may happen in step S84 that no packet is found, step S85 is carried out and the incoming packet is dropped as there is no packet with a PV smaller than the incoming packet. If the number of packets dropped is larger than the space needed for the packet to be inserted, meaning that more space becomes available by dropping the packets a first dummy packet is inserted into the position in step S88 which covers the free space obtained by the difference from the dropped packet size minus the size of incoming packet. If it is determined in step S87 that there is not yet enough space after dropping to insert the new packet, the packet drop is repeated until there is enough space.

Returning to step S82 when it is determined that the packet size of the incoming packet is not larger than the free space available meaning that the packet size is smaller than the free space available, a second dummy packet is inserted in step S89 in the free space between the newly added packet and the last packet available in the buffer. In step S90 finally the packet is inserted into the determined buffer.

Figure 8:
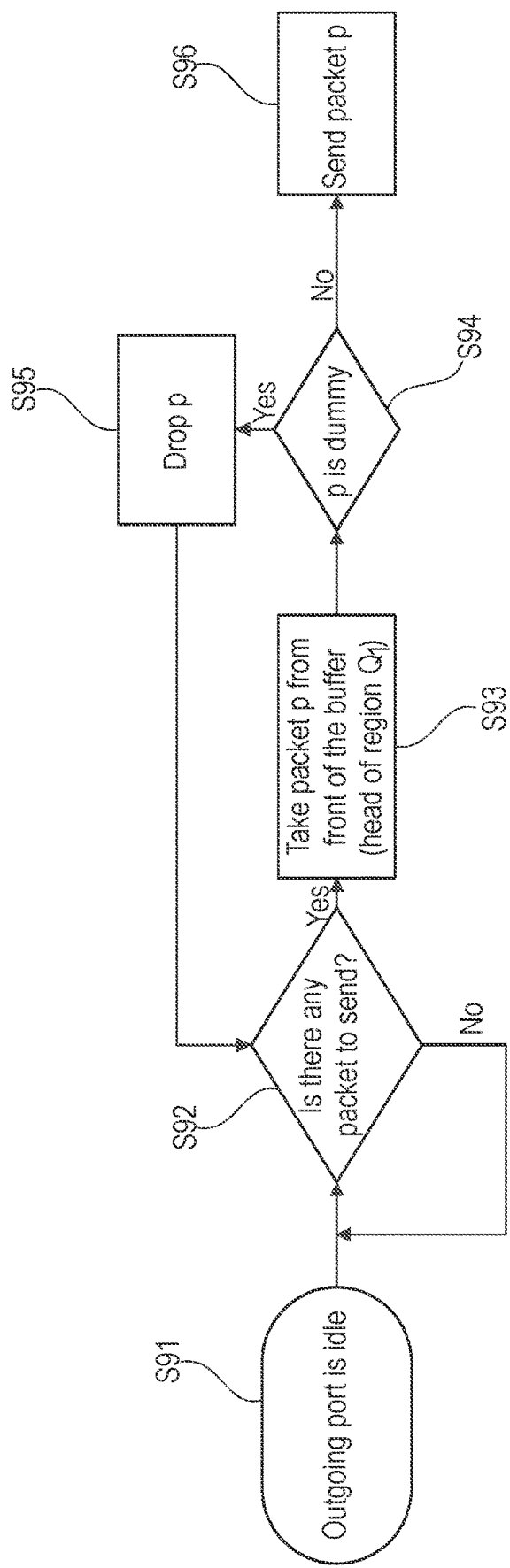
FIG. 8 shows an example flowchart of a method carried out by the node for dequeueing a packet from the buffer.

FIG. 8 describes in more detail the dequeuing of a packet from the buffer. The method starts with the situation that the outgoing port is idle in step S91. In step S92 it is checked whether there is any packet to send. If this is the case, the packet from the front of the buffer is taken and in step S94 it is checked whether data packet is a dummy packet, be it a first dummy packet or a second dummy packet. If this is the case, the packet is dropped and not transmitted and the method returns to step S92. If it is determined in step S94 but the data packet to be sent is not a dummy packet this packet is actually sent in step S96.

Figure 9:
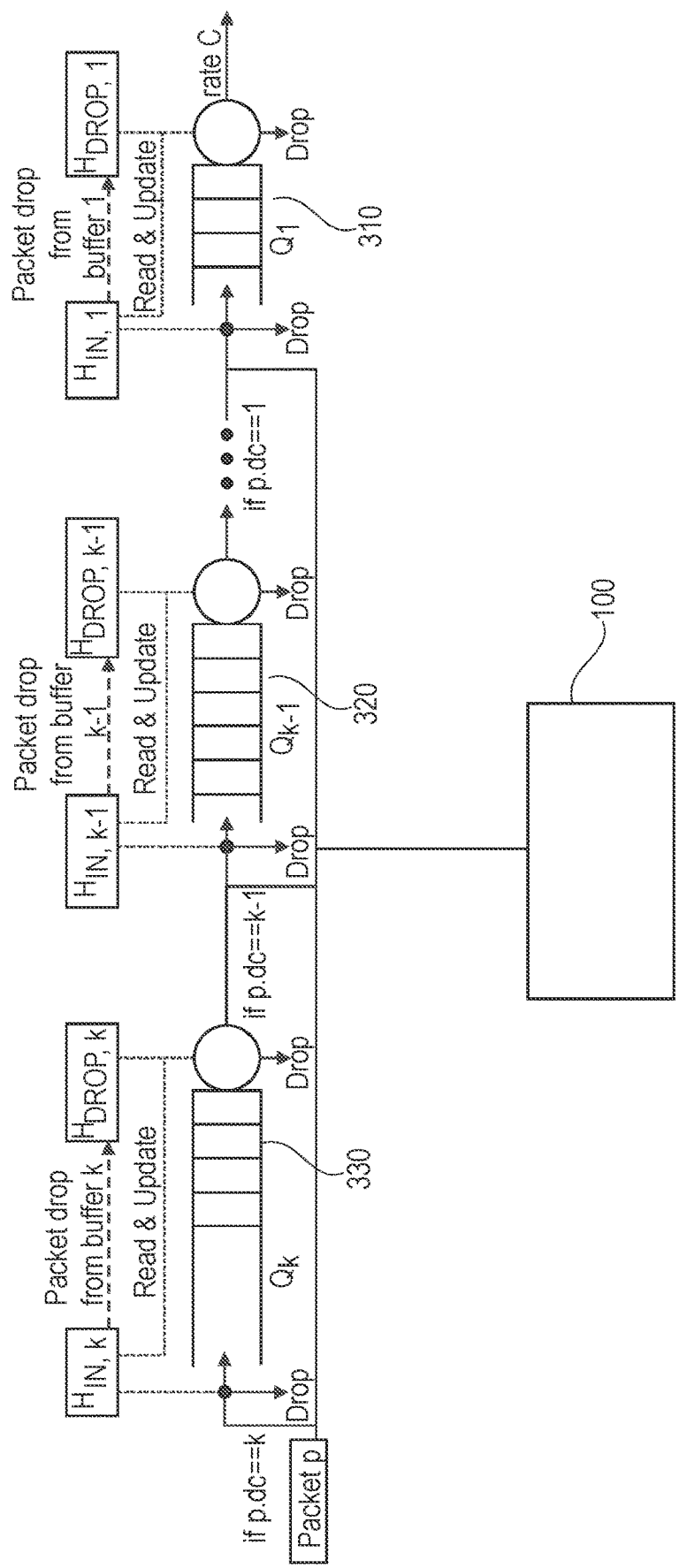
FIG. 9 shows a schematic architectural view of one possible implementation of the node with the transmission buffer transmitting the arriving data packet.

In connection with FIG. 9 a practical implementation is shown in which the transmission buffer with the different buffer regions is implemented by several FIFO buffers. Accordingly, the control entity 100 controls the insertion of new packets in different buffers 310, 320, 330 wherein each buffer stores and newly arriving data packet having certain delay value or delay class. Each of the data packets, in addition to the packet value carries its delay class wherein the delay classes can be completely independent from the resource sharing policy. Accordingly, any part of a flow or sub-flow of a data packet flow may be marked with any delay class.

A practical implementation of the delay-aware Resource Node for k DCs is shown in FIG. 9. For each DC i∈[1, k], a standard FIFO packet buffer $Q_i$ is introduced, which represents the corresponding buffer region shown in FIG. 1. Note that PV is coded logarithmically to 2 octets, v denotes the unsigned integer representing the coded PV, PV=0 is coded to v=0, but different encoding schemes may also be possible. To avoid costly searches in the queue (and mid-queue dropping), it is emulated by maintaining how many bytes to drop from each coded PV (v), and dropping it only when a packet with that PV v reaches the head of the buffer. To achieve that, two histograms are maintained for each $Q_i$:

1. $H_{IN,i}$ for representing how many bytes of each v is stored in the queue for forwarding;
2. $H_{DROP,i}$ for keeping track of how many bytes of each v is to be dropped. Then instead of directly dropping b bytes of coded PV v $H_{IN,i}(v)$-=b and $H_{DROP,i}(v)$+=b is set. The corresponding packet(s) will remain in $Q_i$ until they reach the head of that FIFO queue, when it is finally dropped. This also implements the "Replacing dropped packets with dummy packets" behavior discussed above for the first dummy packet. This is because $H_{DROP,i}$ maintains bytes to be dropped, not packets, and dropping a few bytes from a PV leaves the rest of the bytes of a long packet in the $H_{IN,i}$.

The operation of a Resource Node can be split into the following steps. Let p be the packet arrived; c its delay class, v its coded PV and ps its size in bytes. The actual queue length of $Q_i$ is calculated as $q_i=\Sigma_j H_{IN,i}(j)$, i.e. only including bytes not to be dropped at the queue head. The free space in $Q_1 \ldots Q_i$ is calculated as $s_i=C\times D_i-\Sigma_{j=1}^{i} q_j$.

Figure 10:
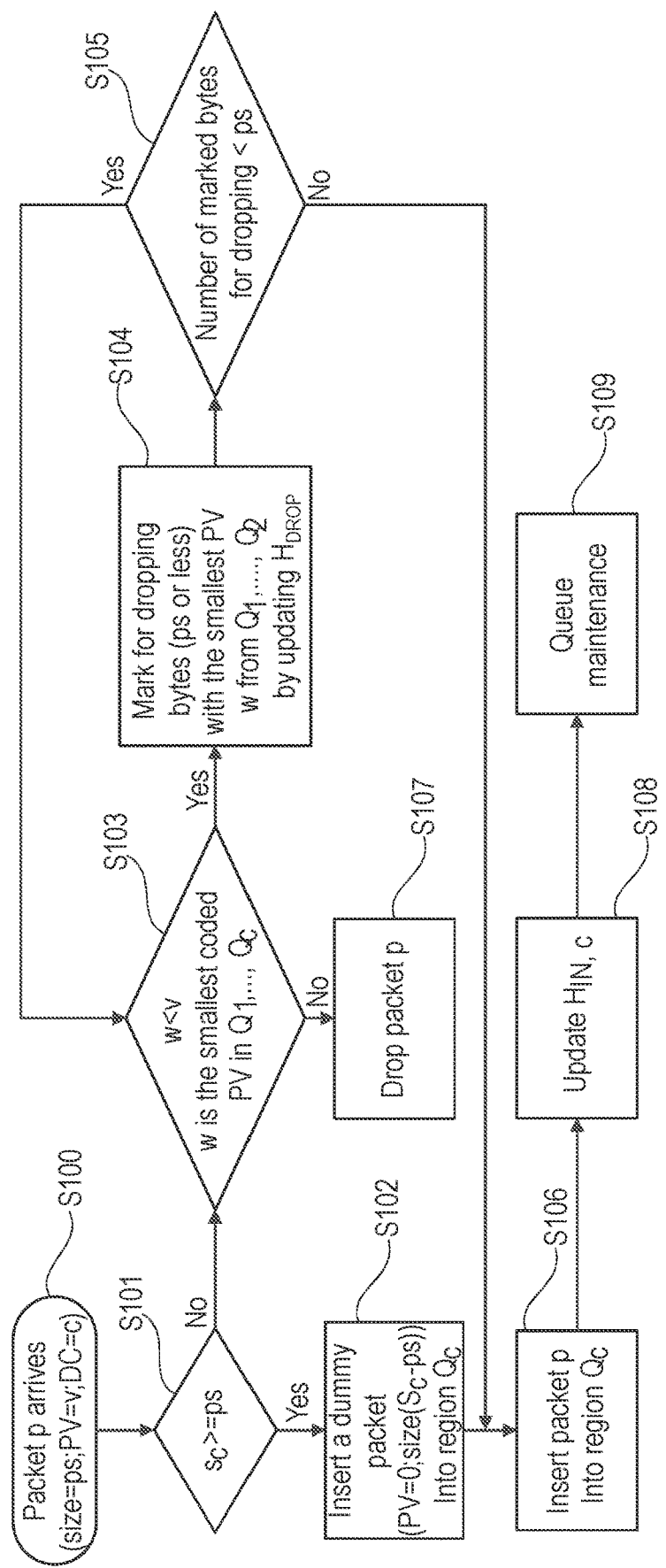
FIG. 10 shows an example flowchart of a method carried out by the node of FIG. 9 in one implementation for enqueueing a packet.

The operational phases as depicted in FIG. 10 are the following:

Enqueue: Upon packet arrival (S100), if there is enough space in $Q_c$, i.e. $s_c \geq ps$ (S101), the packet is inserted to the end of $Q_c$. If $s_c > ps$, a dummy packet with v=0 and size ($s_c$-ps) is inserted before the actual packet (S102). If there is not enough space we mark for dropping bytes with the smallest coded PVs (w) and with w<v (S103, 104) from $Q_1 \ldots Q_c$ until either $s_c=ps$ (S105) or it is not possible to drop more (as all $H_{IN,j}(w)=0$, where j=1 . . . c and w=0 . . . v-1). If succeeded, then p is inserted to the end of $Q_c$ (S106), otherwise it is dropped upon arrival (S107). iN step S108 $H_{IN,c}$ is updated Finally, Queue maintenance is performed for $Q_1 \ldots Q_c$ (S109).

Insert: When a packet p is inserted to $Q_i$, the packet is stored in the FIFO queue and $H_{IN,i}(v)$+=ps.

Marking for dropping: When b bytes of coded PV v is to be dropped from $Q_i$, it is checked whether $H_{IN,i}(v) \geq b$ and if it is, then that amount of bytes are marked for dropping by $H_{DROP,i}(v)+=b$ and $H_{IN,i}(v)-=b$.

Queue maintenance: This step compresses all packets towards the first FIFO queue ($Q_1$). Starting from $Q_1$, queues are filled with packets from queues with higher DCs. A queue $Q_i$ is considered filled if $s_i \leq 0$. If it is not yet filled the first packet p in $Q_j$, where j>i is examined.
  a. Dummy packets with PV>0: If HDROP, j(v)>0 and v>0 then p is dropped.
  b. Dummy packets with PV=0: If v=0 then its size is decreased ps-=min($H_{DROP,j}(0)$, ps). Then if ps=0 it is dropped. Otherwise the amount of free space ($s_i$) in the buffer being filled ($Q_i$) is determined. If $s_i$<ps then we create a dummy packet with PV=0 and size $s_i$, we decrease the size of the original packet ps-=$s_i$ and also update $H_{IN,j}(0)-=si$ and insert the newly created packet into $Q_i$.
  c. Packets not to be dropped: If $H_{DROP,j}(v)=0$ we dequeue p from $Q_j$ and insert it to $Q_i$.

The above process is repeated until all packets are advanced to the first possible place, i.e. the first m FIFO queues are filled and the rest of the packets are in $Q_{m+1}$.

Packet drop: When packet p from $Q_j$ is dropped, it is removed from $Q_j$ then $H_{DROP,j}(V)-=ps$ is updated. Then if $H_{DROP,j}(v)<0$, then $H_{IN,j}(v)+=H_{DROP,j}(v)$ and then $H_{DROP,j}(v)=0$.

Dequeue: Dequeue is initiated by the bottleneck node. The first packet p with PV v and packet size ps in $Q_i$ (j=1 ... k) is dropped if $H_{DROP,j}(v)>0$. This step is repeated until the first packet does not satisfy this condition. Then if a packet p remains, that packet is dequeued, $H_{IN,j}(v)-=ps$, and Queue Maintenance for all queues is performed.

Figure 11:
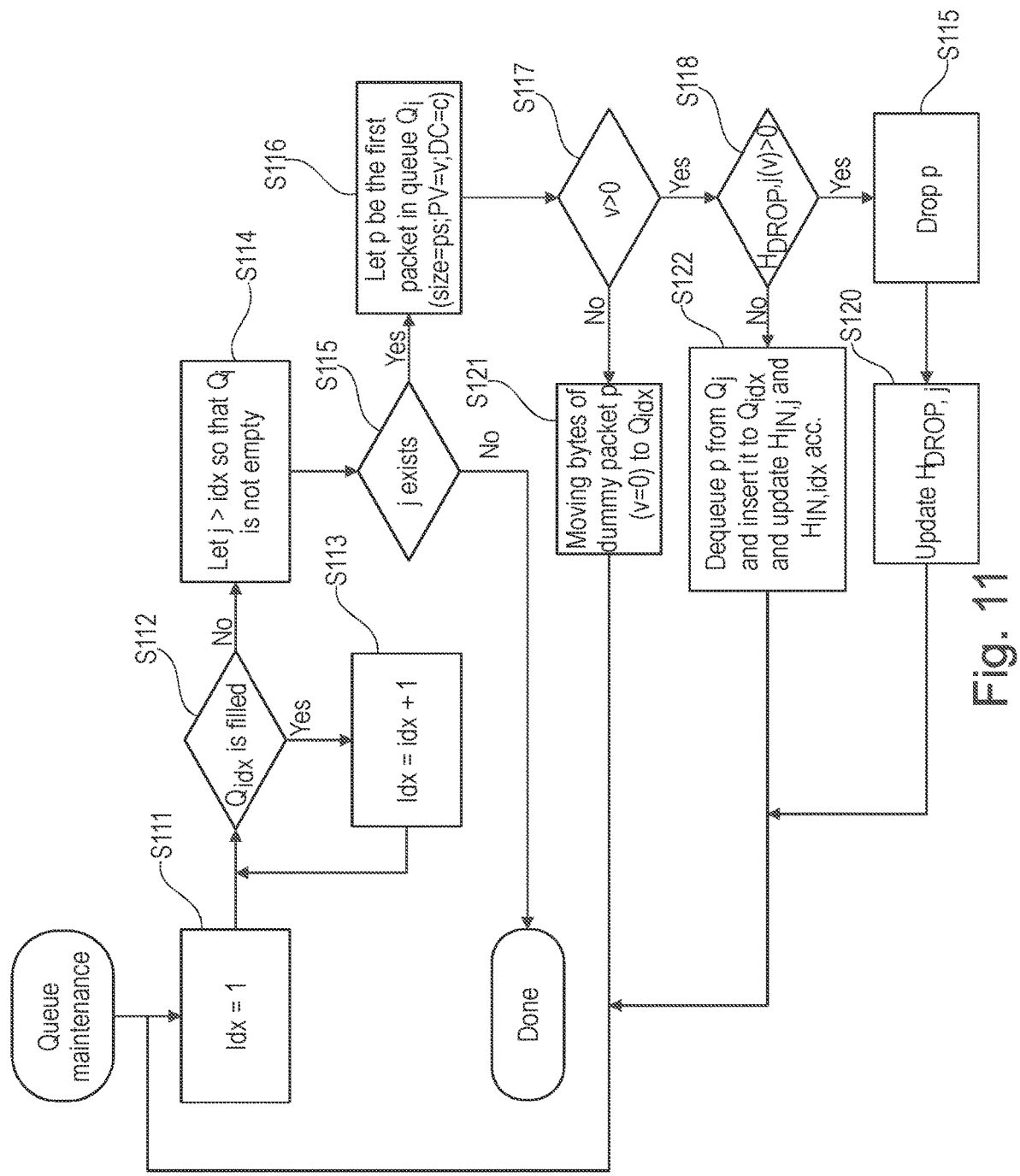
FIG. 11 shows an example flowchart of a method carried out by the node during queue maintenance.

FIG. 11 shows a flowchart of the implementation comprising the two histograms and describing the queue maintenance of step S109 of FIG. 10 in more detail. As discussed above during queue maintenance all packets are compressed towards the first queue, $Q_1$, which is the buffer region comprising the data packets with the highest delay requirements. The method starts in step S111 with the first buffer region and it is checked in step S112 whether the first buffer region is full with data packets. If this is the case the second buffer region is selected in step S113. If not, after step S112 the next buffer region having lower delay requirements is selected in step S114 and it is checked whether this buffer region exists. If this is not the case the process is completed. If such a buffer region exists in step S115 the first packet in this buffer region Qj is determined with its packet size, packet value and delay value in step S116. In step S117 it is checked whether the packet value is higher than the smallest possible packet value. If this is the case it is checked whether the histogram comprising the packets to be dropped comprises data for the determined packet value. If this is the case the packet is dropped in step S119 and the histogram comprising the packets to be dropped is updated accordingly in step S120. If it is detected in step S117 that the first packet is a packet with the lowest packet value, thus, a dummy packet, the bytes of the dummy packet are moved to the buffer region having the next higher delay requirement, so that only dummy packets with the smallest packet value, e.g. PV=0 are moved. If it is determined in step S118 that there is no data to be dropped for the corresponding packet values the packet is dequeued from the present buffer region and is inserted into the next buffer region having the next higher delay requirement and the corresponding histograms comprising the number of bytes in the queue for forwarding is updated.

Figure 12:
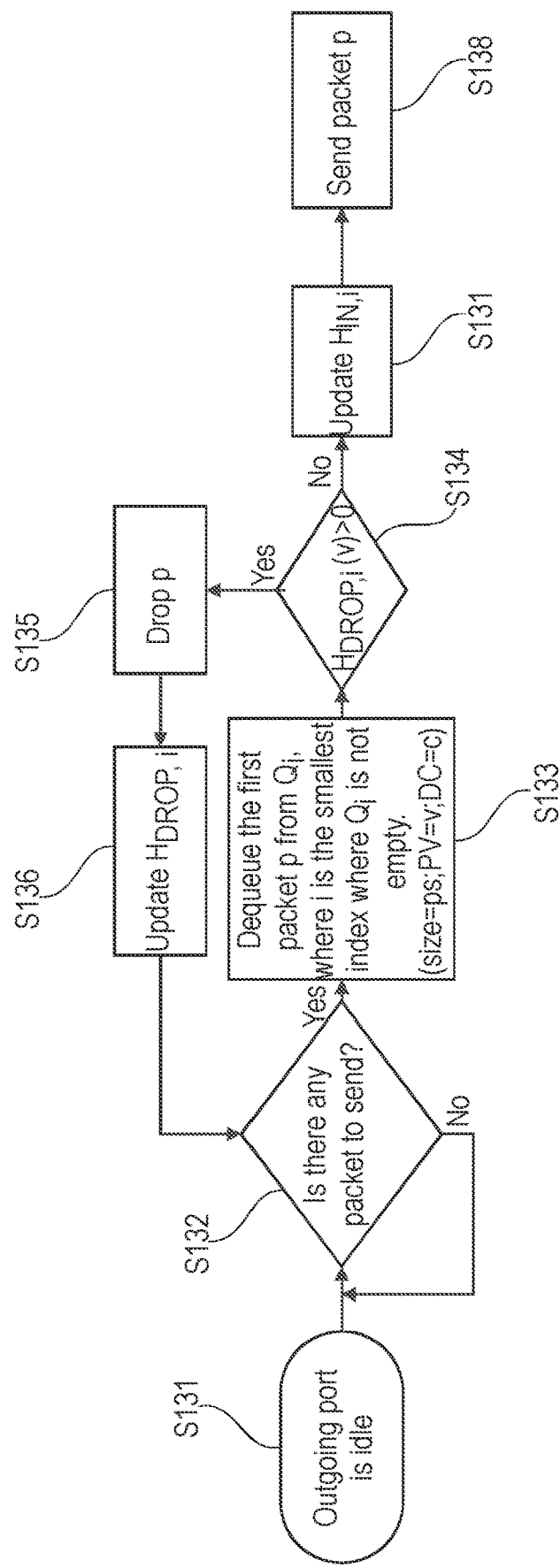
FIG. 12 shows an example flowchart of a method carried out by the node of FIG. 9 for dequeueing a data packet.
Figure 13:
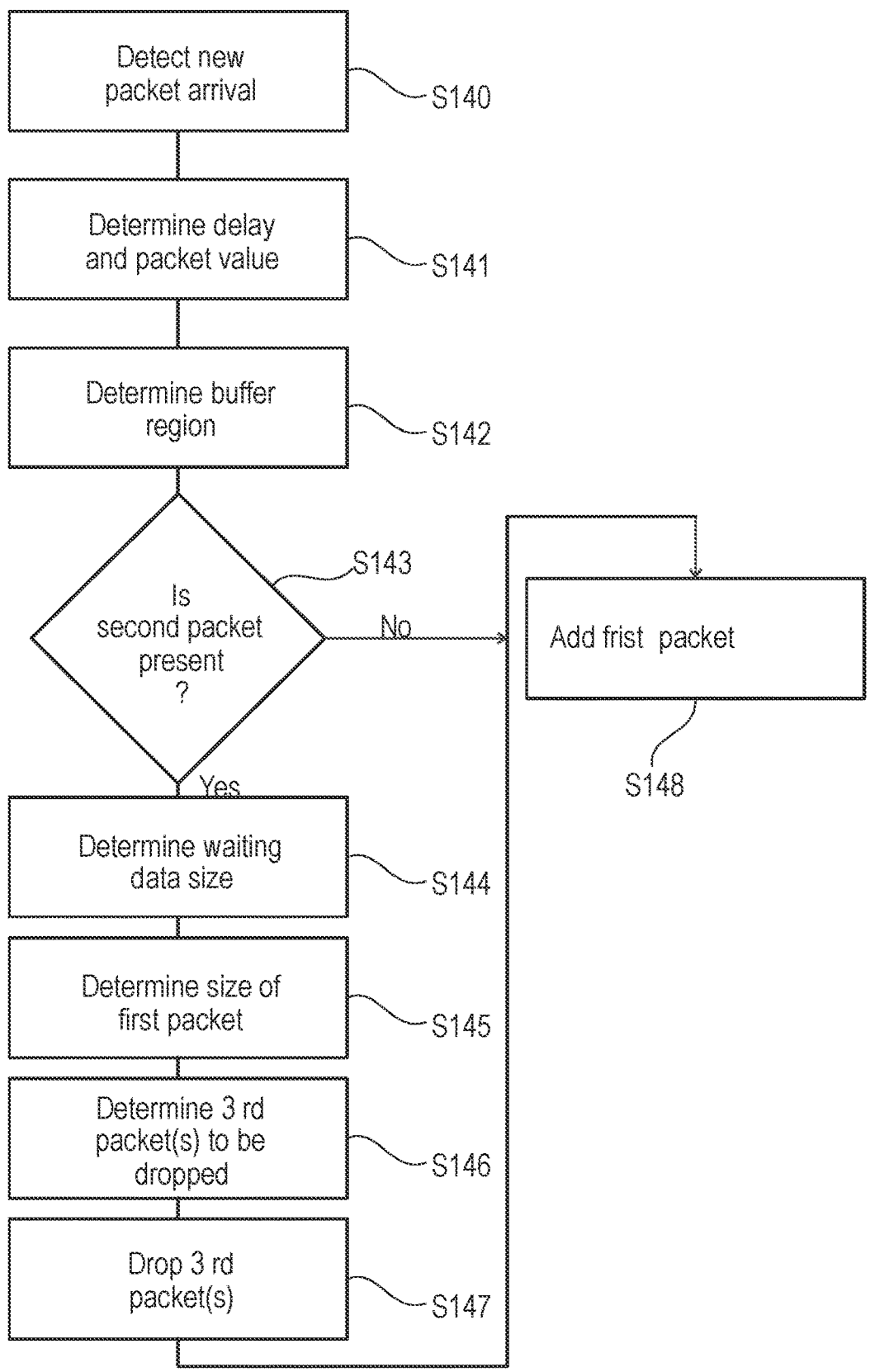
FIG. 13 shows an example flowchart of a method carried out by the node shown in FIG. 1 or 9 for operating the transmission buffer.

FIG. 12 shows the flow chart for dequeueing the packet with the implementation using the histograms. The method starts with the assumption that the outgoing port is idle. In step S132 it is checked whether there is any packet to send. If this is the case, the first packet is dequeued from the corresponding buffer region which is the buffer region which is not empty and which has the highest delay requirement that is not empty (S133). It is then checked in step S134 whether the histogram in the corresponding buffer region comprises packets to be dropped having a packet value, higher than the smallest packet value. This means, that it is not a dummy packet If the histograms comprises data to be dropped, the packet is dropped in step S135 and the corresponding histogram for the packets to be dropped is updated accordingly (steps S135 and S136). If it is determined in step S134, but the histogram for the packet to be dropped does not comprise a packet for the corresponding packet value the histogram representing the bytes or packets stored in the queue is updated in step S137 and the packet is finally sent to the next buffer region in step S138.

Figure 14:
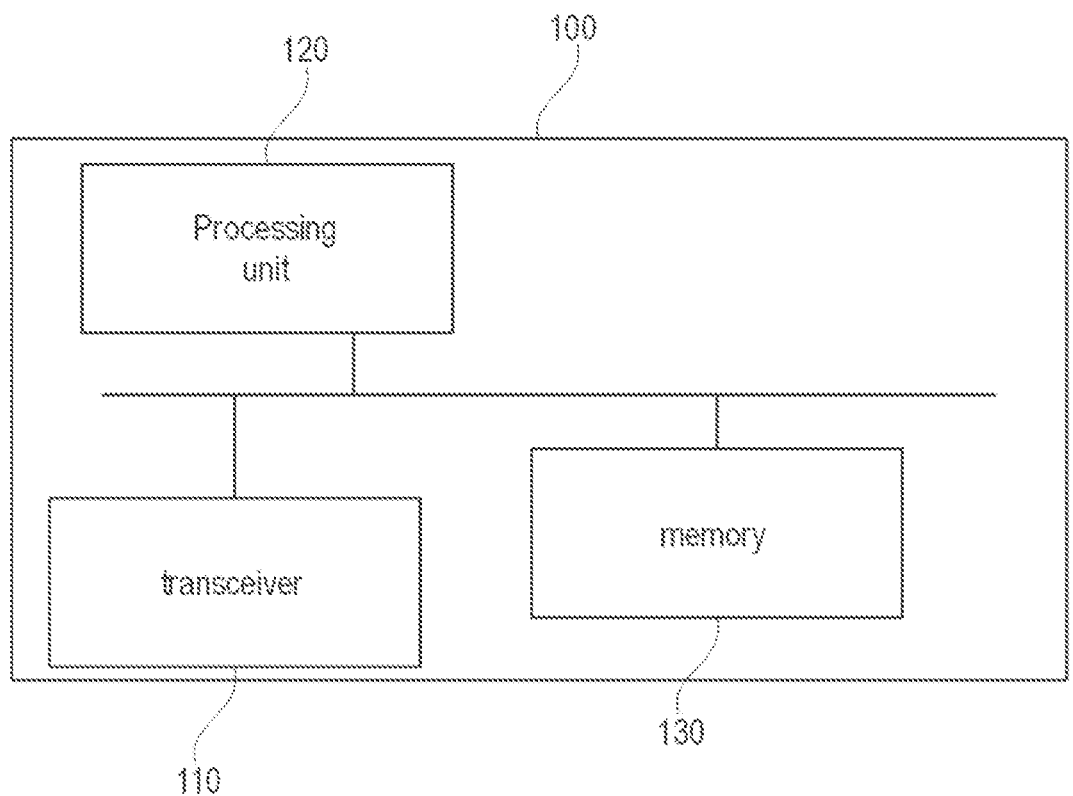
FIG. 14 shows a schematic representation of a control entity configured to control the operation of a transmission buffer as shown in FIGS. 1 to 12.

FIG. 14 summarizes some of the major steps carried out in the above discussed examples. In step S140 the arrival of a new data packet, of a first data packet it is detected. In step S141 the delay and the packet value is determined for the arriving packet in order to be able to determine in which of the buffer regions the packet has to be inserted. In step S142 the buffer region into which the packet is to be inserted is determined based on the determined delay value, and thus in dependence on the delay class. When the buffer region is known it can be determined in step S143 whether there is any data packet, called third data packet present in the buffer which has a lower delay requirement so that it would be sent after the newly arriving packet. If this is the case, the number of data packets or the size of the data packets that is located in the different buffer regions before this second data packet is determined. As the insertion of the first data packet should not increase the number of bytes to be sent for a data packet located behind the first packet to be inserted, the size of the first data packet that is to be inserted is determined in step S145. In step S146 is then determined which of the packets located in front of the second data packet, namely which of the candidate packets have to be dropped in order to be able to insert the second data packet without increasing the data size before the second data packet. In step S147 the third data packet or the third data packets to be dropped are dropped. Returning to step S143 if there is no data packet behind the first packet to be inserted the first data packet can be directly inserted into the corresponding buffer region without dropping any packets.

FIG. 14 shows a schematic architecture view of the control entity 100 configured to control the transmission buffer in a node transmitting data packets to another node. The control entity comprises a transceiver which is provided for transmitting the data packets of the different data packet flows and which is provided for receiving the data packets. The control entity 100 furthermore comprises a processing unit 120 which is responsible for the operation of the control entity 100. The processing unit 120 can comprise one or more processors and can carry out instructions stored on a memory 130, wherein the memory may include a read-only memory, a random access memory, a mass storage, a hard disk or the like. The memory can furthermore include suitable program code to be executed by the processing unit so as to implement the above described functionalities in which the control entity is involved. The memory 130 can furthermore comprise and store the buffer with the different buffer regions as discussed above.

Figure 15:
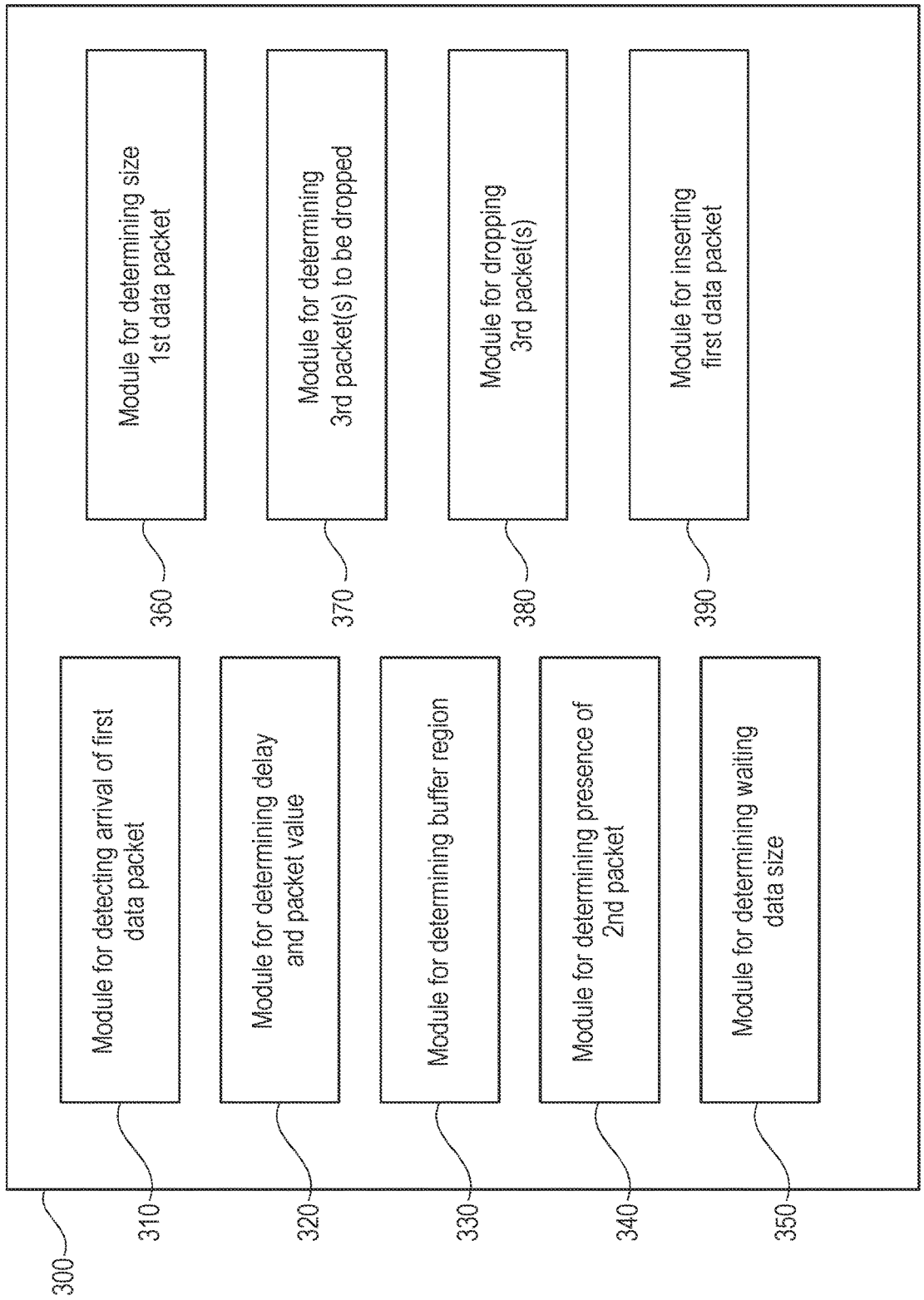
FIG. 15 shows another example schematic representation of a control entity controlling the transmission buffer configured to operate as discussed in connection with FIGS. 1 to 12.

FIG. 15 shows an alternative implementation of the control unit controlling the transmission buffer wherein the control entity 300 comprises a first module 310 configured to detect the arrival of a first data packet which is to be inserted into the buffer. A module 320 is provided for determining the delay value and the packet value. A module 330 is provided and configured to determine the buffer region into which the arriving first packet should be inserted in dependence on the determined delay value. A module 340 is configured to determine the presence of a second packet, meaning that there is any packet located in the buffer which has a lower delay requirement, so that the inserted packet will be inserted in front of the second packet. A module 350 is configured to determine the waiting data size indicating the amount of data or amount of bytes waiting for transmission in front of this second data packet. A module 360 is configured to determine the size of the first data packet that is to be inserted into the corresponding buffer region and in dependence on the data size a module 370 is configured to determine the number of packets to be dropped in order not to increase the waiting data size. These packets are indicated as third packets. A module 380 is provided configured to drop the determined third packets and a module 390 is configured to insert the first data packet to the determined buffer region.

From the above said some general conclusions can be drawn.

Preferably, the different buffer regions operate according to a First-In-First-Out, FIFO, principle and the first packet is added to the end of each buffer region. Accordingly, each data packet present in the buffer before the newly added packet will be transmitted to the next buffer region having a lower delay requirement.

The at least one third data packet may be determined such that it is the data packet of the data packets among the candidate data packets which has the lowest packet value. Accordingly, when a packet has to be dropped in order to be able to insert the first data packet, this data packet, the third packet is determined such that the packet with the lowest packet value is selected and dropped.

Furthermore, it may be determined that the determined buffer region into which the first packet is to be inserted is full and if the packet value of the first packet is smaller or equal to the packet values of the data packets already stored on the determined buffer region and in the buffer regions having higher delay requirements, the first data packet is not added to the determined buffer region and is dropped.

Furthermore, it can be determined that the buffer region is full and if the packet value of the first packet is higher than the packet values of the data packets already stored in the determined buffer region and in the buffer regions having higher delay requirements, the dropping of the at least one third packet from the candidate data packets with the smallest packet value is carried out until there is enough space for the first data packet in the determined buffer region. This was discussed, inter alia, above in connection with FIG. 7.

If the total size of the dropped third packet is greater than the size of the added first packet, a part of the at least one third data packet or at least one of the at least one third data packets may become the first dummy packet which is truncated such that the first dummy packet occupies the space in the determined buffer region between the first packet added to the end of the determined buffer region and a latest data packet from the candidate data packets not dropped as third data packet in the determined buffer region.

As discussed above in connection with FIGS. 2 to 5, the dummy packets help to decrease the number of packets to be dropped.

This first dummy packet may keep its packet value but may never be transmitted to the other note, however it may or may not be transmitted to the next buffer region.

When the first data packet is added to the end of the buffer region and if a free space is provided between the inserted first data packet and a last data packet located in the determined buffer region of or a buffer region having a higher delay requirement, the second dummy packet can be generated and added to the free space with a second dummy size such that the second dummy packet completely covers this free space as discussed in connection with FIGS. 5 and 6.

When a new first data packet should be added to the buffer in one of the buffer regions covered by the second dummy packet, the second dummy packet may be split, and the new first data packet and the remaining part of the second dummy packet after the split cover the space by the second dummy packet before it was split.

Furthermore, the second dummy packet may be split when it covers a border between two buffer regions such that one part of the split second dummy packet is present in the buffer region provided on one side of the border and another part of the split second dummy packet is present in the buffer region provided on the other side of the border.

Furthermore, a lowest possible packet value is assigned to the second dummy packet, and when the second dummy packet is located at a first space in the buffer region with the highest delay requirement, the second dummy packet is dropped and not transmitted.

As discussed in connection with FIGS. 5 and 6 the second dummy packet also help to keep the number of packets to be dropped low.

It is possible that each buffer region is implemented as a separate buffer and the data packets can be transmitted from the buffer region with the lower delay requirement to the buffer region with the higher delay requirement and are transmitted to the other node from the buffer region with the highest delay requirement.

A possible implementation is designed such that for each of the buffer regions a first histogram is determined representing the data size stored in the corresponding buffer region in dependence on the packet value of the data packets. Furthermore, a second histogram representing the data size of each packet value to be dropped is determined.

The two histograms may be used in the following way:

When the first data packet is added to the determined buffer region, the first histogram for the corresponding buffer region can be increased accordingly and if the third data packet is to be dropped, the second histogram can be increased accordingly while decreasing at the same time the first histogram accordingly.

When the data packets are transmitted from the buffer region with the lower delay requirements to the buffer region with the higher delay requirements, and when the data packets are transmitted to the other node from the buffer region with the highest delay requirement, and if there is a free space in the buffer region with the highest delay requirement, the free space maybe filled with packets from buffer region having lower delay requirements.

If the second histogram comprises data packets to be dropped for packet values greater than the smallest possible packet value and if the first dummy packet is to be transmitted from a buffer region having a lower delay requirement to a buffer region having a higher delay requirement, the first dummy packet may be dropped and not transmitted to the buffer region with the higher delay requirement. This was discussed above in connection with FIG. 11, steps S116 to S119.

Furthermore, when a second dummy packet is to be transmitted from a buffer region having a lower delay requirement to a buffer region having a higher delay requirement, the packet size of the second dummy packet is determined. If the packet size of the second dummy packet is greater than zero, a free space is determined in the buffer region having the higher delay requirement and a new second dummy packet is created with the size of the determined free space, when the free space is smaller than the current size of the second dummy packet and the new second dummy packet is added to the buffer region having the higher delay requirement. This was discussed above in connection with FIG. 11, step S121.

The above discussed invention provides and guarantees a certain delay for each of the packets and can be implemented very efficiently. The above described embodiments also work for high bit rates and does not require any amendments when the traffic changes. Furthermore, it can be implemented efficiently in a cloud environment wherein the processing speed is independent of the number of flows over a bottleneck.

The invention claimed is:

1. A method for controlling a transmission buffer in a transmission node of a transmission network transmitting data packets of a data packet flow, wherein each data packet comprises a delay value indicating a transmission delay requirement of the data packet and a packet value indicating a level of importance of the data packet, wherein the transmission buffer comprises different buffer regions provided for inserting newly arriving data packets having different delay requirements, wherein each buffer region stores the newly arriving data packets having a predefined range of relay requirements, the method comprising:
   detecting an arrival of a first data packet to be added to the transmission buffer,
   determining the delay value and the packet value of the first data packet,
   determining the buffer region of the transmission buffer into which the first data packet is to be inserted in dependence on the delay value of the first data packet,
   determining whether a second data packet is present in one of the buffer regions having a lower delay requirement so that the second data packet will be transmitted after the first data packet, wherein in the affirmative,
   determining a waiting data size of candidate data packets which are located in the transmission buffer such that they are waiting for transmission before the second data packet,
   determining a size of the first data packet
   determining at least one third data packet among the candidate data packets to be dropped in response to the first data packet to be added, wherein the at least one third data packet is determined taking into account the packet values of the candidate data packets such that the waiting data size does not increase,
   dropping the at least one third data packet,
   adding the first data packet to the determined buffer region.

2. The method according to claim 1, wherein the different buffer regions operate according to a First-In-First-Out, FIFO, principle and the first packet is added to the end of each buffer region.

3. The method according to claim 1, wherein the at least one third data packet is the data packet or the data packets among the candidate data packets having the lowest packet value.

4. The method according to claim 1, wherein if it is determined that the determined buffer region is full and if the packet value of the first packet is smaller or equal to the packet values of the data packets already stored in the determined buffer region and in the buffer regions having higher delay requirements, the first data packet is not added to the determined buffer region and is dropped.

5. The method according to claim 1, wherein if it is determined that the determined buffer region is full and if the packet value of the first packet is higher than the packet values of the data packets already stored in the determined buffer region and in the buffer regions having higher delay requirements, the dropping of at least one third packet data packet from the candidate data packets with the smallest packet value is carried out until there is enough space for the first data packet in the determined buffer region.

6. The method according to claim 2, wherein if a total size of the dropped third packet is greater than the size of the added first packet, at least one of the at least one third data packet becomes a first dummy packet and is truncated such that the first dummy packet occupies a space in the determined buffer region between the first packet added to the end of the determined buffer region and a last data packet from the candidate data packets not dropped as third data packet in the determined buffer region.

7. The method according to claim 6, wherein the first dummy packet keeps its packet value but is never transmitted.

8. The method according to claim 2, wherein the first data packet is added to the end of each buffer region, wherein if a free space is provided between the inserted first data packet and a last data packet located in the determined buffer region or a buffer region having a higher delay requirement, a second dummy packet is generated and added to the free space with a second dummy size such that the second dummy packet completely covers the free space.

9. The method according to claim 8, wherein the second dummy packet is split when a new first data packet has to be added to the buffer in one of the buffer regions covered by the second dummy packet, wherein the new first data packet and the remaining part of the second dummy packet cover the space covered by the second dummy packet before it was split.

10. The method according to claim 9, wherein the second dummy packet is split when it covers a border between two buffer regions such that one part of the split second dummy packet is present in the buffer region provided on one side of the border, and another part of the split second dummy packet is present in the buffer region provided on the other side of border.

11. The method according to claim 8, wherein a lowest possible packet value is assigned to the second dummy packet, wherein when the second dummy is located at a first space in the buffer region with the highest delay requirement, the second dummy packet is dropped and not transmitted.

12. The method according to claim 1, wherein each buffer region is implemented as one buffer, wherein data packets are transmitted from the buffer region with the lower delay requirement to the buffer region with the higher delay requirement and are transmitted to the other node from the buffer region with highest delay requirement.

13. The method according to claim 1, wherein for each of the buffer regions a first histogram is determined representing the data size stored in the corresponding buffer region in dependence of the packet value of the data packet, and a second histogram representing the data size for each packet value to be dropped.

14. The method according to claim 13, wherein when the first packet is added to the determined buffer region, the first histogram for the corresponding buffer region is increased accordingly, and if the third data packet is to be dropped, the second histogram is increased accordingly while decreasing the first histogram accordingly.

15. The method according to claim 1, wherein data packets are transmitted from the buffer region with the lower delay requirement to the buffer region with the higher delay requirement and are transmitted to the other node from the buffer region with highest delay requirement, wherein if there is a free space in the buffer region with the highest relay requirement, the free space is filled with data packets from buffer regions having lower delay requirements.

16. The method according to claim 7, and any of claims 13 to 15, wherein if the second histogram comprises data packets to be dropped for packet values greater than the smallest possible packet value, and if the first dummy packet is to be transmitted from a buffer region having a lower delay requirement to a buffer region having a higher delay requirement, the first dummy packet is dropped.

17. The method according to claim 11, when a second dummy packet is to be transmitted from a buffer region having a lower delay requirement to a buffer region having a higher delay requirement, the packet size of the second dummy packet is determined, wherein if the packet size of the second dummy packet is greater than zero, a free space is determined in the buffer region having the higher delay requirement, a new second dummy packet is created with the size of the determined free space, when the free space is smaller than a current size of the second dummy packet, and the new second dummy packet is added to the buffer region having the higher delay requirement.

18. A control entity configured to control an operation of a transmission buffer provided in a transmission node transmitting data packets of a data packet flow, wherein each data packet comprises a delay value indicating a transmission delay requirement of the data packet and a packet value indicating a level of importance of the data packet, wherein the transmission buffer comprises different buffer regions provided for inserting newly arriving data packets having different delay requirements, wherein each buffer region stores the newly arriving data packets having a predefined range of relay requirements the control entity comprising a memory and at least one processing unit, the memory containing instructions executable by said at least one processing unit, wherein the control entity is operative to:
    detect an arrival of a first data packet to be added to the transmission buffer,
    determine the delay value and the packet value of the first data packet,
    determine the buffer region of the transmission buffer into which the first data packet is to be inserted in dependence on the delay value of the first data packet,
    determine whether a second data packet is present in one of the buffer regions having a lower delay requirement so that the second data packet will be transmitted after the first data packet, wherein in the affirmative,
    determine a waiting data size of candidate data packets which are located in the transmission buffer such that they are waiting for transmission before the second data packet,
    determine a size of the first data packet
    determine at least one third data packet among the candidate data packets to be dropped in response to the added first data packet, wherein the at least one third data packet is determined taking into account the packet values of the candidate data packets such that the waiting data size does not increase,
    drop the at least one third data packet,
    add the first data packet to the determined buffer region.

19. A control entity configured to control an operation of a transmission buffer provided in a transmission node transmitting data packets of a data packet flow, wherein each data packet comprises a delay value indicating a transmission delay requirement of the data packet and a packet value indicating a level of importance of the data packet, wherein the transmission buffer comprises different buffer regions provided for inserting newly arriving data packets having different delay requirements, wherein each buffer region stores the newly arriving data packets having a predefined range of relay requirements the control entity comprising a memory and at least one processing unit, the memory containing instructions executable by said at least one processing unit, wherein the control entity is operative to:
    detect an arrival of a first data packet to be added to the transmission buffer,
    determine the delay value and the packet value of the first data packet,
    determine the buffer region of the transmission buffer into which the first data packet is to be inserted in dependence on the delay value of the first data packet,
    determine whether a second data packet is present in one of the buffer regions having a lower delay requirement so that the second data packet will be transmitted after the first data packet, wherein in the affirmative,
    determine a waiting data size of candidate data packets which are located in the transmission buffer such that they are waiting for transmission before the second data packet,
    determine a size of the first data packet
    determine at least one third data packet among the candidate data packets to be dropped in response to the added first data packet, wherein the at least one third data packet is determined taking into account the packet values of the candidate data packets such that the waiting data size does not increase,
    drop the at least one third data packet,
    add the first data packet to the determined buffer region,
    further being operative to implement each buffer region in one buffer, and to transmit the data packets from the buffer region with the lower delay requirement to the buffer region with the higher delay requirement and to transmit the data packets to the other node from the buffer region with highest delay requirement.

20. A control entity configured to control an operation of a transmission buffer provided in a transmission node transmitting data packets of a data packet flow, wherein each data packet comprises a delay value indicating a transmission delay requirement of the data packet and a packet value indicating a level of importance of the data packet, wherein the transmission buffer comprises different buffer regions provided for inserting newly arriving data packets having different delay requirements, wherein each buffer region stores the newly arriving data packets having a predefined range of relay requirements the control entity comprising a memory and at least one processing unit, the memory containing instructions executable by said at least one processing unit, wherein the control entity is operative to:

detect an arrival of a first data packet to be added to the transmission buffer, determine the delay value and the packet value of the first data packet, determine the buffer region of the transmission buffer into which the first data packet is to be inserted in dependence on the delay value of the first data packet, determine whether a second data packet is present in one of the buffer regions having a lower delay requirement so that the second data packet will be transmitted after the first data packet, wherein in the affirmative, determine a waiting data size of candidate data packets which are located in the transmission buffer such that they are waiting for transmission before the second data packet, determine a size of the first data packet determine at least one third data packet among the candidate data packets to be dropped in response to the added first data packet, wherein the at least one third data packet is determined taking into account the packet values of the candidate data packets such that the waiting data size does not increase, drop the at least one third data packet, add the first data packet to the determined buffer region, further being operative to transmit the data packets from the buffer region with the lower delay requirement to the buffer region with the higher delay requirement and to transmit the data packets to the other node from the buffer region with highest delay requirement, wherein if there is a free space in the buffer region with the highest relay requirement, the control entity is operative to fill the free space with data packets from buffer regions having lower delay requirements.

* * * * *